Feb. 2, 1932.　　　J. B. OLSON　　　1,843,296
FLOAT CONTROLLED VALVE MECHANISM
Filed May 23, 1929　　　2 Sheets-Sheet 1

INVENTOR.
John B. Olson
BY
Wheeler, Wheeler & Wheeler
ATTORNEYS.

Feb. 2, 1932.　　　J. B. OLSON　　　1,843,296

FLOAT CONTROLLED VALVE MECHANISM

Filed May 23, 1929　　2 Sheets-Sheet 2

INVENTOR.
John B. Olson
BY
Wheeler, Wheeler & Wheeler
ATTORNEYS.

Patented Feb. 2, 1932

1,843,296

UNITED STATES PATENT OFFICE

JOHN B. OLSON, OF FORT ATKINSON, WISCONSIN, ASSIGNOR TO JAMES MANUFACTURING COMPANY, OF FORT ATKINSON, WISCONSIN, A CORPORATION OF WISCONSIN

FLOAT CONTROLLED VALVE MECHANISM

Application filed May 23, 1929. Serial No. 365,303.

My invention relates to improvements in valve mechanisms for watering devices, with particular reference to mechanisms employed for poultry waterers.

Objects of my invention are, to provide float controlled valve mechanisms with means whereby the valve may be manually closed and secured in its closed position independently of the float; to provide means whereby the float may be supported independently of the water which normally determines its position; to provide means whereby the water container may be separated from a water trough or pan with which it is normally associated without allowing an escape of water from the container and without danger to the float and associated mechanism during transportion of the container from one place of installation to another; to provide improved valve fittings for float controlled watering outfits; and to improve float controlled valve mechanisms generally with reference to the type employed in watering outfits.

In the drawings.

Like parts are identified by the same reference characters throughout the several views.

Figure 1:
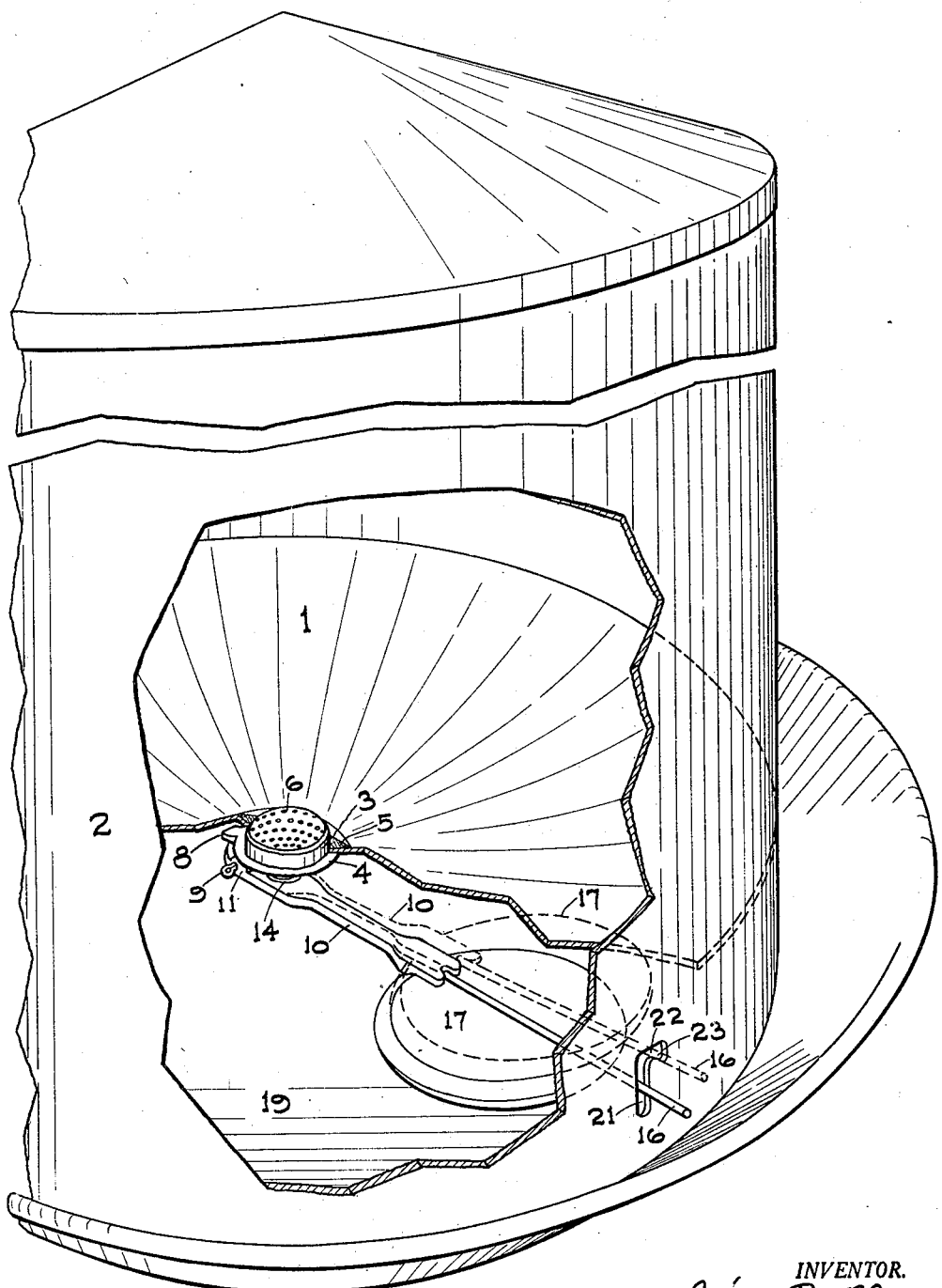
Figure 1 is an isometric view of a fragment of a poultry waterer, with portions of the water container broken away to expose the valve and float mechanism.

The bottom 1 of a water container 2 is centrally apertured to receive the cylindrical body 3 of a casting having an annular flange 4, which fits against the outer surface of the bottom, whereby the cylindrical body may be inserted through the aperture from below, and the casting then anchored in place by a body of cementitious material or molded material 5, which may be flowed or molded into the angle between the cylindrical body 3 and the upper surface of the bottom 1 and allowed to harden, whereby a water tight joint may be formed, and the body of the casting securely anchored in position.

A screen 6 is preferably soldered or otherwise secured over the open upper end of the cylindrical body 3.

The flange 4 has an outwardly projecting arm 8, which is apertured to receive a cotter pin 9, which constitutes a fulcrum for the float lever 10. The latter is provided with upwardly projecting ears 11 having openings or slots to receive the fulcrum pin 9 and allow the lever to swing horizontally as hereinafter described, the slots being preferably arcuate in a horizontal plane.

The body 3 of the casting is also provided with a downwardly projecting tubular boss 12 having its lower margin faced to form a valve seat. Directly underneath this seat, the lever 10 is provided with a socket in which a rubber disk 14 is mounted in a position to bear against the valve seat member 12 when the lever is raised. This disk is adapted to serve as a valve, its position being such that when the lever is raised, it may be brought into water tight relation to the seat.

The lever 10 has a rod-like extension 16, and a float 17 is attached to the underside of the lever at an intermediate point. The side wall of the container 2 is extended below the bottom 1 to form a support 18, whereby the container is held in a raised position above the bottom of the pan 19, and this supporting portion 18 of the side wall is provided with a slot having a vertical portion 21 through which the rod 16 normally extends beyond the float 17, this slot being adapted to allow the lever to be lifted to a valve closing position, or lowered to a valve opening position. The slot has a lateral extension 22, and the lower wall of this lateral extension is provided with a depression 23 in which the end portion 16 of the lever 10 may be received when the lever is first lifted and then swung laterally into the slot extension 22. The diameter of the valve disk 14 is such as to allow the valve to close the port regardless of the lateral adjustment of the lever.

The rod 16 is resilient enough to allow it to swing over the high point between the depression 23 and the vertical portion 21 of the slot, and the arrangement is such that the valve will be held fully closed when the lever is in the depression 23. When it is swung to registry with the vertical portion 21, the valve will be allowed to open, unless the water in the pan 19 is at a sufficient level to support the float at a point where the valve will be kept closed.

It will be observed that the rear portion of the lever, i. e., the portion 10, is in the form of a flat plate which extends to the rear of the cotter pin a distance substantially equal to the length of the arm 8, said arm therefore serving as a stop to limit the downward movement of the float and the float supporting arm of the lever 10, although if desired, this downward movement may be limited by the lower end of the slot 21.

It will be obvious that the valve may be manually closed at any time, either preparatory to a removal of the container from the pan or for any other purpose, while the container or reservoir is in position within the pan. It is sometimes desirable to shut off the water feed temporarily without removing the container, and this can be accomplished by adjusting the lever into valve locking position, with its end portion resting in the depression 23. Also when the container is removed from the pan, the lever may be swung into and out of locking position to observe the operation of the valve without allowing water to escape to a greater extent than may be desirable for such testing purposes. The entire device is simply and cheaply made, the valve disk 14 can be easily replaced by any attendant, and the entire structure can be made at minimum cost.

Figure 2:
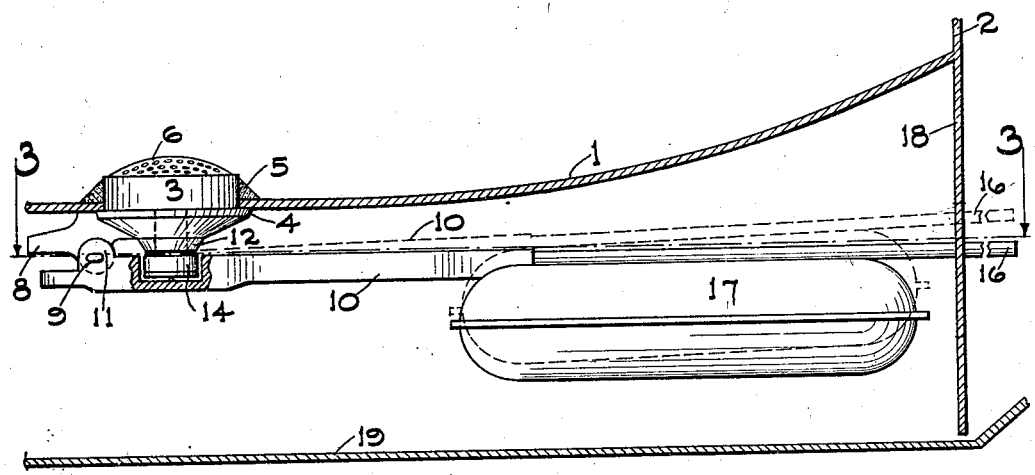
Figure 2 is a side elevation of the valve and float mechanism, showing fragments of the container and watering pan in vertical section.
Figure 3:
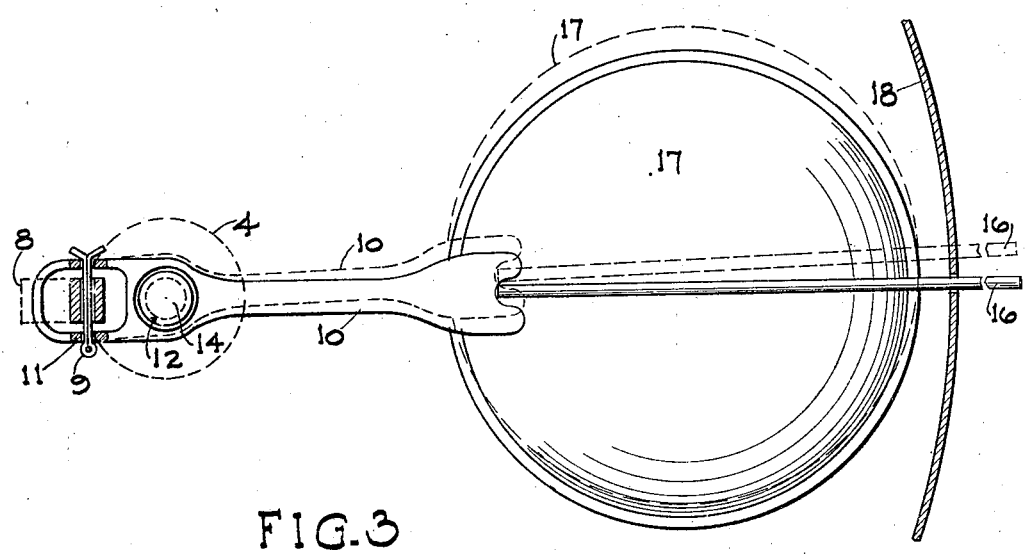
Figure 3 is a sectional view, drawn to line 3—3 of Figure 2.

In the structure as disclosed, the container with its controlling valve and float mechanism is a self-contained unit, independent of the circular pan in which it is shown in Figure 1, and capable of being placed in any watering trough having a flat bottom or substantially flat bottom of sufficient dimensions to receive the container. When placed in any pan or watering receptacle, the float and float mechanism are protected from foreign matter which can only enter the space underneath the bottom of the container by passing through the opening provided for the lever 16 and, as clearly shown in Figure 2, this opening is above the level of the water, the upper level of which is determined by the float.

I claim:

1. The combination with a water container having a ported bottom, and having its side wall extended below the bottom to form a support for the container, said side wall extension being provided with a vertical slot extended laterally at its upper end, a lever pivotally connected with the container and provided with a valve for closing the port in the bottom thereof, said lever having an arm extending through said slot and adapted to be positioned in either the vertical or the laterally extending portion thereof while the valve is closed.

2. The combination with a water container having an opening in its bottom, a ported casting having a flange fitted to the under side of the container bottom, and a portion projecting upwardly therethrough, a body of sealing material molded about the interior portion of said casting to form a water tight joint between it and the interior surface of the bottom of the container, and a lever operated valve for closing said port, said valve comprising a disk socketed in the lever, and said lever being provided with a float and a manually operable extension.

3. The combination with a watering receptacle, of a reservoir loosely resting upon the bottom of the receptacle, said reservoir being provided with a raised ported bottom and an opening in a side wall below the bottom, float controlled valve mechanism normally housed by the reservoir side walls below the bottom and controlling deliveries through said port, and said valve mechanism including a float having an arm exposed for manual manipulation through the side wall opening, said receptacle having a portion extended beyond the housing to expose some of the water therein for drinking purposes.

4. The combination with an open water receptacle, of a removable reservoir having a raised ported bottom and valve mechanism attached to the under side of the bottom including a valve actuating arm and float secured to the arm, said arm and float having a substantially rigid projection extending beyond the reservoir side wall, said side wall being extended below the bottom of the reservoir to form a reservoir support, housing the valve mechanism and provided with an opening through which said projection extends.

5. The combination with an open water receptacle, of a removable reservoir having a raised ported bottom and valve mechanism attached to the under side of the bottom including a valve actuating arm and float secured to the arm, said arm and float having a substantially rigid projection extending beyond the reservoir side wall, said side wall being extended below the bottom of the reservoir to form a reservoir support, housing the valve mechanism and provided with an opening through which said projection extends, together with means for securing said projection in a float supporting and valve closing position.

6. A portable water container adapted to be loosely placed in a watering receptacle, said container having a ported bottom and side walls extending below the bottom to form a housing and a support for the container, a valve for said port and valve mechanism within the housing including a valve actuating arm, a float attached thereto and having a projection exposed through an opening in the housing wall, said wall being provided with means for supporting the projection with the float in a raised valve closing position whereby the reservoir may be transported with the valve closed.

7. The combination with a watering pan, of a removable water container having its side walls extended below its bottom to form a housing and provided with a vertically extending slot, the bottom of the reservoir being provided with a port, and the space within said housing being provided with valve mechanism supported from the reservoir and having a laterally projecting valve actuating arm extending through the slot, a float secured to said arm intermediate of its ends, and means for supporting the arm in valve closing position from the housing wall.

JOHN B. OLSON.